United States Patent [19]
Hosoda et al.

[11] Patent Number: 5,864,821
[45] Date of Patent: Jan. 26, 1999

[54] METHOD AND APPARATUS FOR TRANSMITTING DATA IN CORRESPONDENCE TO A PROGRESS STAGE OF A SERIES OF BUSINESS PROCESSINGS

[75] Inventors: Naofumi Hosoda, Yokohama; Masato Tamaki, Zushi; Toshihiko Mori; Masafumi Itabashi, both of Tokyo; Mitsuko Yoshimoto, Kawasaki, all of Japan

[73] Assignee: Hitachi, Ltd., Tokyo, Japan

[21] Appl. No.: 622,630

[22] Filed: Mar. 27, 1996

[30] Foreign Application Priority Data

Mar. 29, 1995 [JP] Japan ................................. 7-071043

[51] Int. Cl.$^6$ ................................................ G06F 155/00
[52] U.S. Cl. ................................................ 705/8; 705/11
[58] Field of Search ..................... 705/1, 11, 8; 358/434, 358/402, 403, 404; 379/93.24

[56] References Cited

U.S. PATENT DOCUMENTS

| 5,093,918 | 3/1992 | Heyen et al. | 395/725 |
| 5,283,665 | 2/1994 | Ogata | 358/434 |
| 5,293,250 | 3/1994 | Okumura et al. | 358/402 |
| 5,325,310 | 6/1994 | Johjnson et al. | 358/402 |

*Primary Examiner*—Frantzy Poinvil
*Attorney, Agent, or Firm*—Antonelli, Terry, Stout & Kraus, LLP

[57] ABSTRACT

Even if undecided portion is contained in the data which is necessary for a series of business processings, necessary data is transmitted to the business processing section which wants to confirm the necessary data without carrying out the destination specifying operation. When inputting data from the business processing section in charge of input, parameters representing the degrees of decision are input together with the data and are stored in a database which is common to the business processing sections, the progress stage of a series of business processings is judged on the basis of a progress stage definition table in which the relation between the input situation of the data items and the parameters, and the progress stages of the series of business processings is defined. The data items which are to be transmitted in the progress stages and the transmission destinations are judged based on a transmission destination definition table in which the relation among the progress stages of the series of business processings, the data items as objects of the transmission and the transmission destinations is defined. The data of interest is fetched from the common database, and is transmitted to a data input/output unit of the business processing section as the transmission destination obtained by the judgement results.

32 Claims, 15 Drawing Sheets

FIG. 3

DATA STORAGE FRAME IN COMMON DB 210

| ORDER NO. | 0001 | | | | | |
|---|---|---|---|---|---|---|
| NAME OF CUSTOMER | CONTENTS OF PRODUCT | TRANSACTION PRICE | | | | |
| ABC CO.,LTD. | UN-INPUTTED | ¥ 20,000 | UN-DECIDED | | | |
| APPOINTED DELIVERY DAY FOR CUSTOMER | ACCEPTANCE DAY | SHIPPING DAY | | ⋯ | | |
| PLACE FOR DELIVER | PAYMENT CONDITIONS | | | | | |
| | | | | | | |

301 — ORDER NO.
302 — NAME OF CUSTOMER
303 — DECIDED
304 — (line to ABC CO.,LTD.)
302 — APPOINTED DELIVERY DAY FOR CUSTOMER
302 — PLACE FOR DELIVER

FIG. 4

| CODE | PARAMETER |
|------|-----------|
| 00 | NOT INPUT |
| 01 | UNDECIDED |
| 11 | DECIDED |

STATUS DEFINITION TABLE 248

| DATA ITEM / STATUS | ORDER NO. | NAME OF CUSTOMER | CONTENTS OF PRODUCT | TRANSACTION PRICE | APPOINTED DELIVERY DAY FOR CUSTOMER | ACCEPTANCE DAY | PLACE FOR DELIVER | ... |
|---|---|---|---|---|---|---|---|---|
| STANDARD STATUS | | | | | | | | |
| EXISTENCE OF DEAL | DECIDED | | | | | | | |
| START OF ESTIMATION | DECIDED | DECIDED | UNDECIDED | | | | | |
| PREPARATION OF PRECONTRACT | DECIDED | DECIDED | UNDECIDED | | | | | |
| PREPARATION OF DECISION | DECIDED | DECIDED | DECIDED | DECIDED | UNDECIDED | | | |
| SUMMING UP OF CREDIT SALE | DECIDED | DECIDED | DECIDED | DECIDED | DECIDED | DECIDED AND DAY'S CURRENTLY OUT | UNDECIDED | |
| SUMMING UP OF PROCEEDS | DECIDED | DECIDED | DECIDED | DECIDED | DECIDED AND DAY'S CURRENTLY OUT | DECIDED AND DAY'S CURRENTLY OUT | DECIDED | |
| ... | | | | | | | | |
| USER DEFINITION STATUS | | | | | | | | |
| IN ESTIMATION a | DECIDED | | | MORE THAN ¥200,000 | | | | |
| IN ESTIMATION b | DECIDED | UNDECIDED | | | | | UNDECIDED | |
| ... | | | | | | | | |

FLOW OF PROCESSING OF SETTING AND REGISTERING STANDARD STATUS

FIG. 7

STATUS ITEM TABLE  700

| CODE | STATUS ITEM |
|---|---|
| 1 | EXISTENCE OF DEAL |
| 2 | START OF ESTIMATION |
| 3 | PREPARATION OF PRECONTRACT |
| ⋮ | ⋮ |
|  |  |
| $\ell$ | IN ESTIMATION a |
| $\ell+1$ | IN ESTIMATION b |
| ⋮ | ⋮ |
| m |  |

711 — IN ESTIMATION a
712 — IN ESTIMATION b

DATA ITEM TABLE

| CODE | DATA ITEM |
|---|---|
| 1 | ORDER NO. |
| 2 | NAME OF CUSTOMER |
| 3 | CONTENTS OF PRODUCT |
| 4 | TRANSACTION PRICE |
| 5 | APPOINTED DELIVERY DAY FOR CUSTOMER |
| ⋮ | ⋮ |
| n | |

FLOW OF PROCESSING OF SETTING AND REGISTERING USER DEFINITION STATUS

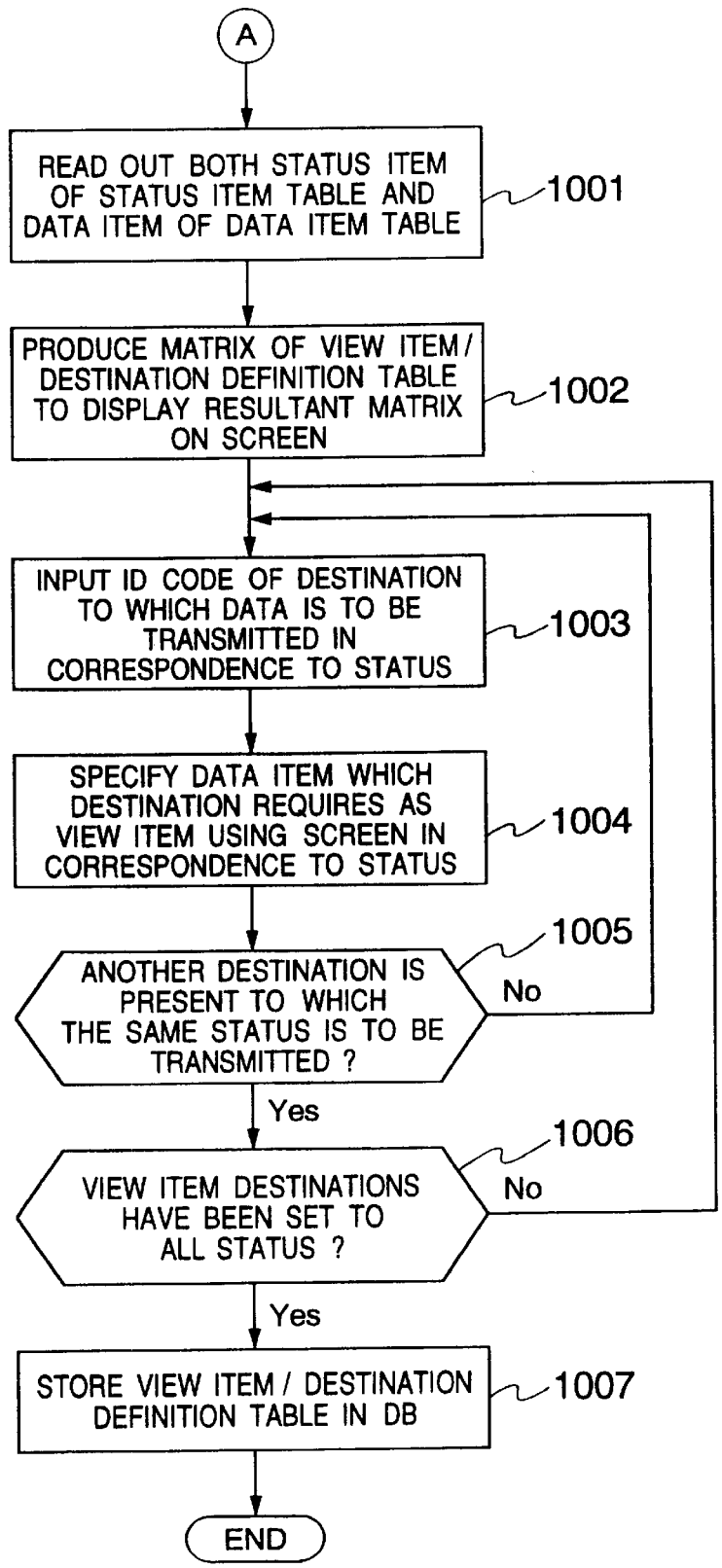
FIG. 10 FLOW OF PROCESSING OF SETTING AND REGISTERING VIEW ITEM / DESTINATION

FIG. 11    VIEW ITEM / DESTINATION DEFINITION TABLE 1100

| DATA ITEM / STATUS | ORDER NO. | NAME OF CUSTOMER | CONTENTS OF PRODUCT | TRANSAC-TION PRICE | APPOINTED DELIVERY DAY FOR CUSTOMER | ... | DESTINETION ID CODE 1101 |
|---|---|---|---|---|---|---|---|
| ... | | | | | | | ... |
| PREPARATION OF PRECONTRACT | ○ 1102 | | | | | | 0120 |
| PREPARATION OF PRECONTRACT | | | ○ | | | | 0140 |
| PREPARATION OF DECISION | | ○ | ○ | ○ | | | 0120 |
| PREPARATION OF DECISION | | ○ | ○ | ○ | ○ | | 0150 |
| PREPARATION OF DECISION | | ○ | ○ | ○ | | | 0160 |
| ... | | | | | | | ... |
| IN ESTIMATION a | | ○ | ○ | ○ | | | 0170 |
| IN ESTIMATION b | | ○ | ○ | | ○ | | 0120 |
| ... | | | | | | | ... |

STANDARD STATUS (808, 805)    USER DEFINITION STATUS (806)

FLOW OF PROCESSING OF STATUS JUDGEMENT

FIG. 13

COMPARISON STANDARDS OF PARAMETERS

| SETTING ON STATUS DEFINITION TABLE | CORRESPONDING PARAMETER OF PARAMETERS ADDED TO DATA VALUES OF COMMON DB | |
|---|---|---|
| NO SETTING | UNINPUTTED OR UNDECIDED OR DECIDED | 1301 |
| UNDECIDED | UNDECIDED OR DECIDED | 1302 |
| DECIDED | DECIDED | 1303 |

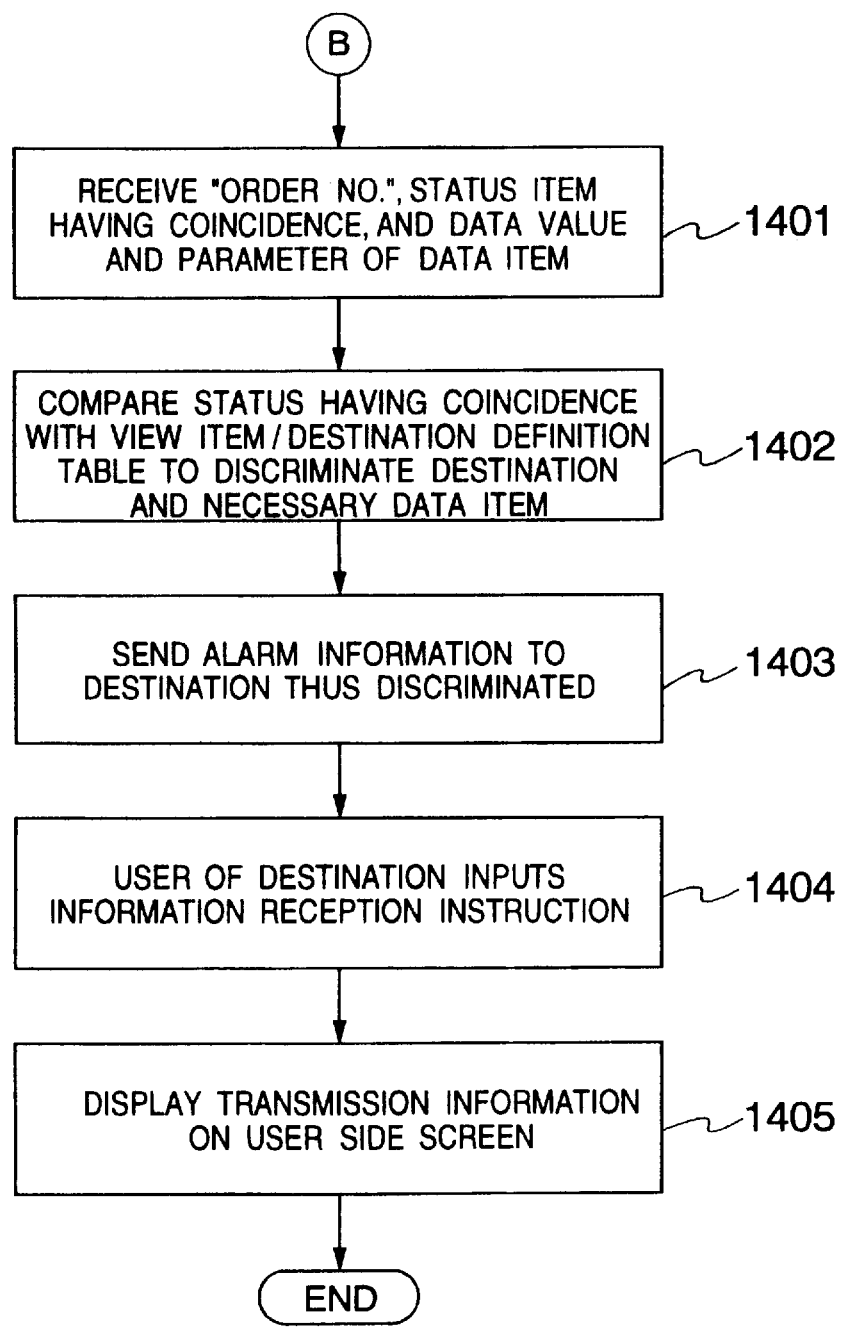

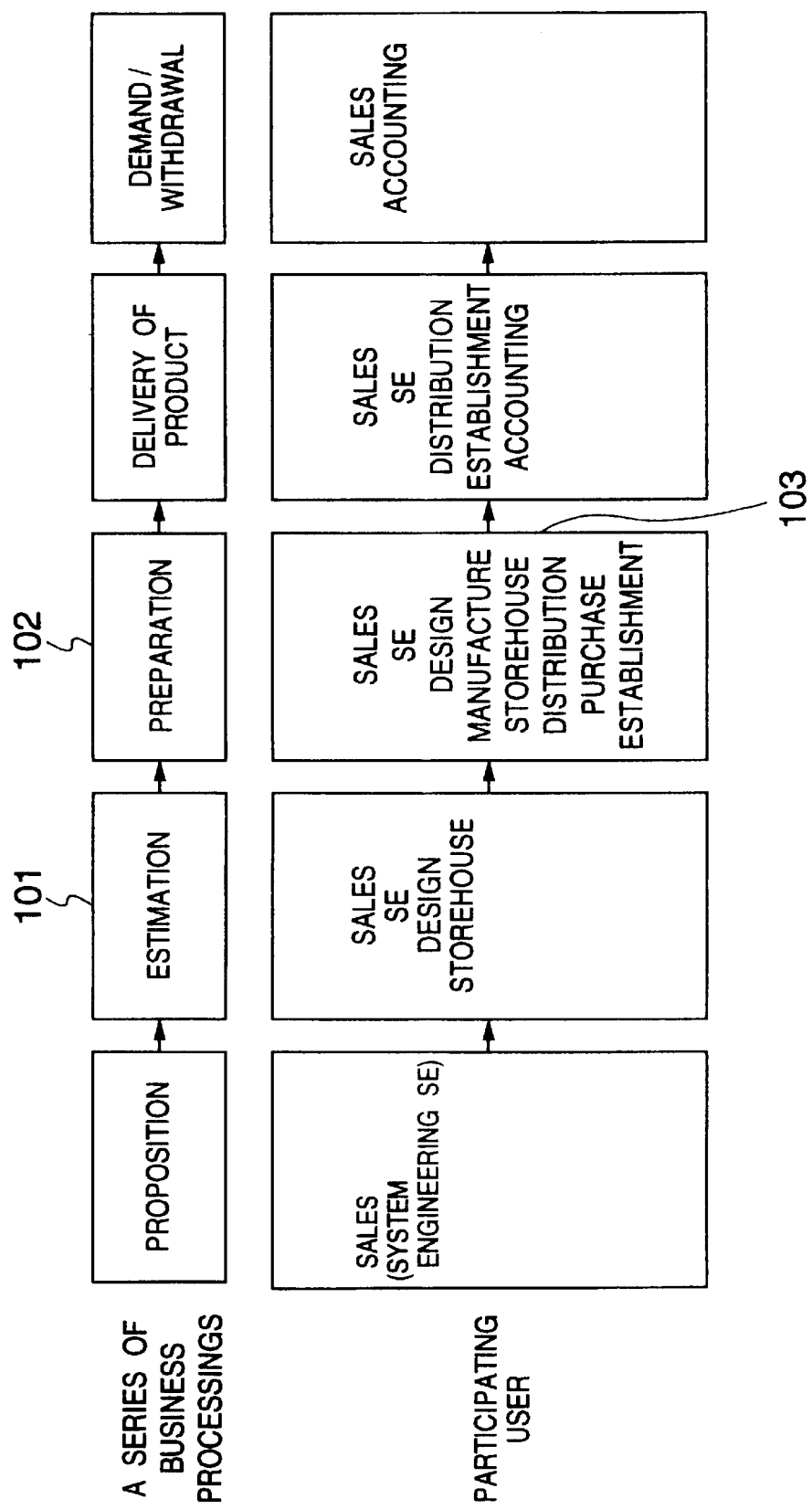

METHOD AND APPARATUS FOR TRANSMITTING DATA IN CORRESPONDENCE TO A PROGRESS STAGE OF A SERIES OF BUSINESS PROCESSINGS

BACKGROUND OF THE INVENTION

The present invention relates in general to a method and an apparatus for transmitting data in correspondence to a progress stage of a series of business processings, and more particularly to a method and an apparatus which are capable of carrying out suitable data transmission in business activities in which a series of business processings are carried out through the participation of many business processing sections or many persons in charge of the business processings.

While it has been popularized that a series of business processings utilizing a database are carried out by a computer, business processings based on the electronic transmission of data between the sections in charge of the business processing of interest, in which the information processing technology is utilized, have been rapidly increased in various business activities in business enterprises as the scale of networks have been enlarged, and also end user computing is improved due to open system and down sizing.

However, even through data exchange utilizing such information processing technologies is applied to a series of business processings utilizing the database, actually, information transmission in the business processings which are conventionally carried out by exchanging paper based cutforms, documents and papers between sections in charge of the business processings (or the persons in charge of the business processings) is merely replaced with processing in which a section in charge of a business processing produces cutforms, documents and the like as electronic data, and the data in units of the cutforms and the documents are transmitted/received to/from the next section in charge of the next business processing by utilizing online networks and the like. In other words, it is difficult to say that a series of business processings utilizing the database, and the exchange of the business data, between the sections in charge of the business processings utilizing online network are carried out closely in cooperation with each other.

In the present circumstances as described above, since data of cutforms is treated as the units of data delivery, when all of the data has become complete with respect to the cutforms in a certain section in charge of the business processing, all of the data is transmitted to the next section. Therefore, any section subsequent to the next section in charge of the subsequent business processings cannot be informed of contents of data until all of the data on the cutforms has been decided.

SUMMARY OF THE INVENTION

The present invention was made in the light of the above-mentioned problems, and therefore, it is the principal object of the present invention to provide a data transmission method by which regardless of the stage of processing in a series of business processings, a person in charge of a business processing can transmit data in the stage of interest to the business processing sections which are not directly participating in the present stage of the series of business processings, without carrying out the destination specifying operation.

It is another object of the present invention to provide a data transmission method, for a series of business processings, by which even when the undecided portion is contained in the necessary data in a certain stage of a series of business processings, if there is a business processing section (a section in charge of a business processing or a person in charge of a business processing) requiring other decided data, other decided data can be transmitted to the associated business processing section, and also the operation for repeatedly inputting the common data is then unnecessary.

It is still another object of the present invention to provide a data transmission method, in a series of business processings, by which data which has been input in each of the business processing sections can be freely obtained by a predetermined business processing section.

In order to attain the above-mentioned objects, in the present invention, for example, when inputting every data item in a series of business processings, parameters representing the degrees of decision of the data are input together with the data. Then, the progress stage (hereinafter referred to as "status") of a series of business processings is specified on the basis of the combination of the degrees of decision and/or data values with respect to the data items which have been input. Then, only the data of the predetermined data items can be automatically transmitted to the section to which the data of interest is to be transmitted and which is predetermined for the specified progress stage.

In addition, in the present invention, in order to attain the above-mentioned objects, a data transmission method includes, for example, the first step of inputting, when inputting data of a plurality of items as a transmission object from a data input/output unit in a business processing section in charge of inputting the data, parameters representing the degrees of decision of the data together with the data, and storing the data and the parameters in a database which is common to the business processing sections; the second step of checking at all times the data stored in the database by referring to a progress stage defining table, in which the relationship among the input situation of the data items, the judgement conditions containing the parameters and the progress stage of a series of business processings is defined, and specifying the progress stage of a series of business processings; and the third step of judging the data items to be transmitted in the progress stage, which has been specified in the second step, and a destination of transmission by referring to a transmission destination defining table, in which the relationship among the progress stages in a series of business processings, the data items of the transmission object, and the destination of transmission, fetching the data of the corresponding data items from the database, and transmitting the data to a data input/output unit in the business processing section corresponding to the destination of transmission which has been obtained from the judgement results.

In addition, in order to attain the above-mentioned objects, for example, the data transmission method may provide that the definitions which are common to the business processing sections and the definitions which are inherent in the respective business processing sections can be set in the progress stage definition table and the transmission destination definition table, respectively.

Firstly, in a series of objective business processings, when the business processing sections (the sections in charge of the business processing or the persons in charge of the business processing) input the data of a plurality of items which is commonly necessary to carry out the business, the parameters representing the degrees of decision of the data are input together with the data and then are stored in the database which is common to the business processing sections.

The data of a plurality of items which has been stored in the database is checked at all times by the progress stage definition table, thereby specifying the progress stage of a series of business processings.

Next, both the data items to be transmitted in the progress stage which has been judged in the second step, and the destination of the data transmission are judged by referring to the transmission destination definition table, and the data of the corresponding data items is fetched from the database to be transmitted to the data input/output unit in the business processing section as the destination of transmission which has been obtained on the basis of the judgement results.

Thus, when it is assumed that the data which is to be transmitted from the section A to the section B extends over the three data items a1, a2 and a3 for example, the definition is carried out in the progress stage definition table in such a way that when the data of the data items a1 and a2 has been input, the progress stage proceeds by one step, and also the definition is further carried out therein such that in that process stage, the data of the data items a1 and a2 is transmitted to the section B. Then, while the data of the data item a3 is still undecided or not yet input, only the data of the data items a1 and a2 will be transmitted to the section B.

As a result, even if the undecided portion is contained in the data which is necessary to carry out a series of business processings, the necessary data can be transmitted to the business processing section (the section in charge of the business processing or the person in charge of the business processing) which wants to confirm that necessary data in advance. In addition, the business processing section which has received the necessary data is made aware of the progress situation of a series of business processings from the contents of the received items.

In this case, since the destination is defined in the transmission destination table, the destination specifying operation with respect to the transmission/ reception of the data also becomes also unnecessary.

In addition, since the data of the names of the customers and the like which is used commonly in the business processing sections is input in any stage in a series of business processings and then is stored in the common database, it becomes unnecessary to repeatedly input such data in a plurality of stages.

If in addition to the definitions which are common to the business processing sections, the definitions which are inherent in the respective business processing sections are set in the progress stage defining table and the transmission destination defining table, respectively, the necessary data is transmitted to the corresponding business section in accordance with the inherent definitions.

As a result, by setting the definitions which are inherent in the respective business processing sections, the necessary data out of the data which has been input during a series of business processings can be obtained freely by the associated business processing section.

Incidentally, if the data representing the progress stage is transmitted together with the defined data items, the reception side can immediately determine the progress stage without judging the contents of the received data items.

BRIEF DESCRIPTION OF THE DRAWINGS

The above and other objects of the invention will be seen by reference to the description taken in connection with the accompanying drawings, in which:

FIG. 3 is a schematic view showing a structure of a data storage frame in a common DB;

FIG. 4 is a schematic view explaining an example of parameters each representing the degree of decision of the data;

FIG. 5 is a schematic view showing a structure of a status definition table;

FIG. 7 is a schematic view showing a structure of a status item table;

FIG. 10 is a flow chart showing the processing of setting/registering a view item/destination definition table;

FIG. 11 is a schematic view showing a structure of the view item/destination definition table;

FIG. 13 is a schematic view useful in explaining an example of the comparative standard of the parameters;

FIG. 14 is a flow chart showing the processing of transmitting the data; and

FIG. 15 is a schematic view useful in explaining an example of the progress stage of a series of selling business processings and the sections in charge of the selling business which participate a series of selling business processings.

DESCRIPTION OF THE PREFERRED EMBODIMENTS

Figure 1:
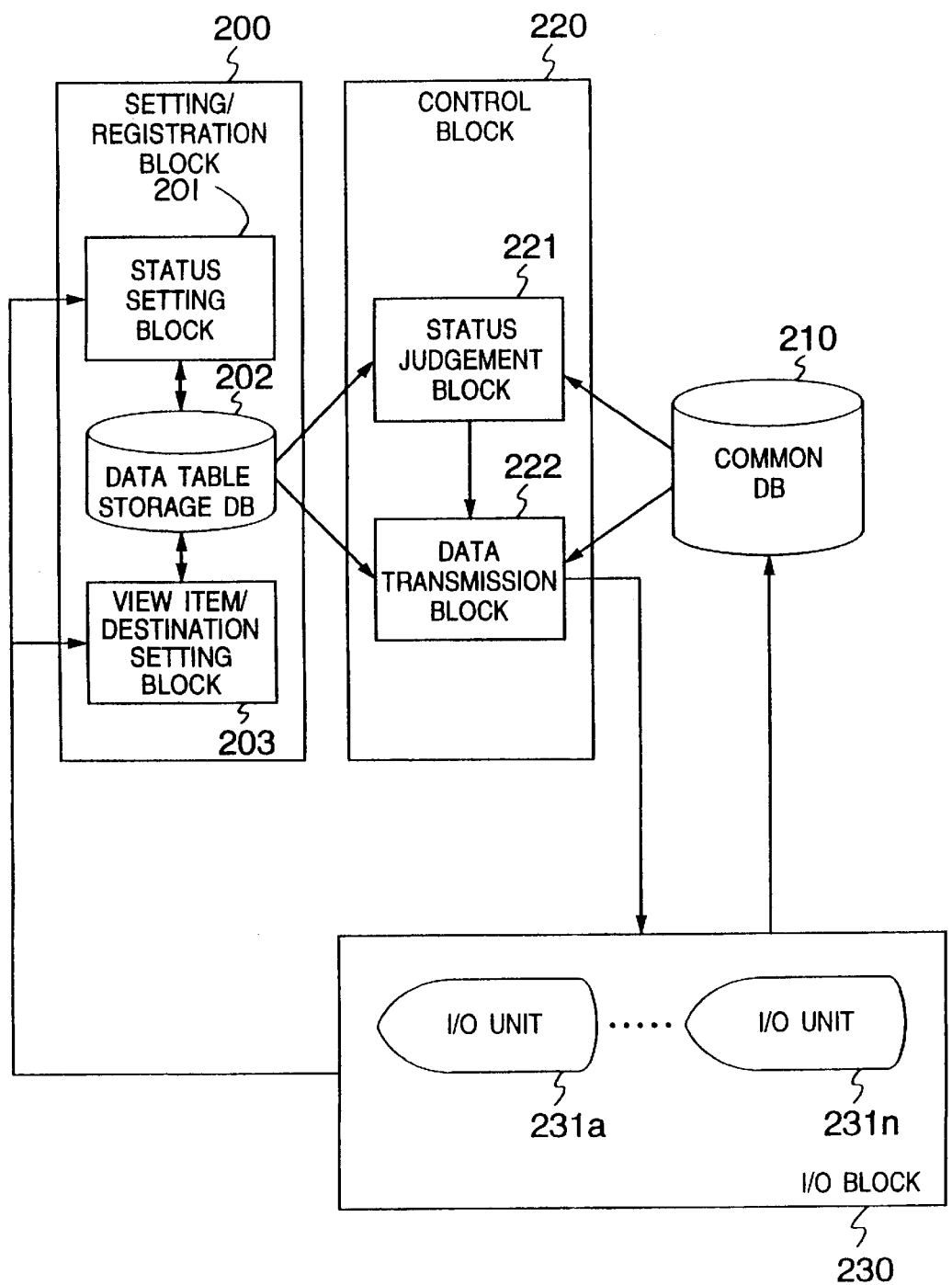
FIG. 1 is a block diagram showing a configuration of an embodiment of a system to which a data transmission method of the present invention is applied.

An embodiment of the present invention will hereinafter be described in detail with reference to the accompanying drawings.

Firstly, an example of a system is assumed in which a business processing system utilizing a database is simply combined with the electronic data exchange, between the sections in charge of the business processings, which is carried out through a network as represented by an electronic computer originated mail (E-COM), and then the problems associated therewith are now considered.

FIG. 15 shows an example of a series of selling business processings, and the sections (or the persons) in charge of the selling business which participate a series of selling business processings. In the example shown in FIG. 15, the product is proposed to the customer, and the product contents, the price, the appointed delivery day and the like are specifically negotiated in the negotiation progresses. Then, after the contract for the product has been established, the relevant sections are instructed to prepare the supply of materials, the design and manufacture of the product, the security of the stock, the carrying in and establishment of the product, and the like. After the product has been prepared, the product is delivered to the customer. Then, after delivery of the product has been completed, the demand and the withdrawal of the price are carried out. In the estimation stage 101, negotiations with the customer are made. There may be the case where when the contract has been established, even if the data of the product contents is not determined in the estimation stage 101 in a series of business processings for instructing the relevant sections to prepare the product of interest by using the preparation cutform in the preparation stage 102, the manufacture section 103 is required to quickly become informed of at least the data of the product.

However, in the example shown in FIG. 15, using the method in which when all of the data on the cutforms which is necessary for the processings in the section of interest has been completed and all the data is transmitted to the next section in charge of the business processing, the next section cannot be informed of the undecided data at all. This is a problem.

In addition, in a series of business processings, since the data upon which the decision is established is not necessarily unique, the data transmission path between the sections in charge of the business processing and the data which is required at that time are not necessarily unique either. For example, if the negotiation of the product contents progresses in advance in the estimation stage 101, the necessary data will be transmitted ahead to the section in charge of estimating the product. Conversely, if the negotiation of the appointed delivery day progresses in advance, the necessary data will be transmitted ahead to the section in charge of estimating the appointed delivery day.

However, in the method shown in FIG. 15, the section in charge of the business processing on the data transmission side specifies both the destination of the reception side section and the transmission contents on all such occasions, and, under such conditions, carries out the transmission processing. Therefore, there arises a problem that a burden is imposed on the section in charge of the business processing, and also time is lost in the information transmission.

In addition, in the method shown in FIG. 15, since through a series of business processings, the many kinds of cutforms are produced, and the delivery of the data is carried out between the sections in charge of the business processing in units of the cutforms, there arises a problem that the same data such as the name of the customer and the name of the product needs to be input repeatedly to the different cutforms.

Therefore, by the method in which the business processing system utilizing the database is simply combined with the electronic data exchange, between the sections in charge of the business processing which is carried out through the network, the above-mentioned problems cannot be solved.

Then, the problems associated with the above-mentioned example of the system shown in FIG. 15 are solved by the present invention as shown in FIG. 1.

FIG. 1 is a block diagram showing a configuration of an embodiment of a data transmission system to which a data transmission method of the present invention is applied. In the figure, the data transmission system according to the embodiment includes a setting registration block 200, a common database (also referred to as "a common DB") 210, a control block 220, and an input/output block 230.

The setting registration block 200 serves to set the definition data of a status definition table in which the progress stage (i.e., the status) of a series of business processings is defined, and a destination table in which the transmission destination is defined. The setting registration block 200 includes, but is not limited to, a status setting block 201, a data table storage database (also referred to as "a data table storage DB") 202, and a view item/destination setting block 203.

The status setting block 201 sets the definition data of the status definition table in which the progress stages of a series of business processings are defined. During the setting of the definition data of the status definition table, first, the same data items which have been set as the input/output items in the common DB 210 are selectively read out from the data table storage DB 202. Then, when the definition data of the status in which the status items, the data items and the parameters representing the degrees of decision of the data values thereof are combined with one another has been input from an input/output unit 231*a* of the section in charge of the business processing having the setting registration power, the definition contents of the status items thus input are stored in the data table storage DB 202.

The view item/destination setting block 203 set the destination data of the destination table in which the transmission destination is defined. During the setting of the definition data of the destination table, the same data items as those set in the common DB 210 are selectively read out from the data table storage DB 202. Then, when both of the destinations of the sections in charge of the business processing which require the data transmission in the progress stages and the definition data representing the view items (the data item group which are required by the section in charge of the business processing) have been input, the contents of the view items and the destination thus input are stored in the data table storage DB 202.

On the other hand, the common DB 210 stores both the data of a plurality of items which the sections (or the persons) in charge of the business processing require when carrying out the respective businesses and the parameters representing the degrees of decision of the data. The data for the sections in charge of the business processing is input from input/output units 231*a* to 231*n* of the input/output block 230 which are provided in correspondence to the sections.

The control block 220 judges both the present progress stage of a series of business processings and the destination of the data transmission corresponding to the progress stage, and also fetches the data which is necessary for any one of the input/output units 231*a* to 231*n* of the destination corresponding to the judgement results from the common DB 210 to transmit the necessary data thereto. The control block 220 includes, but is not limited to, a status judgement block 221 and a data transmission block 222.

The status judgement block 221 compares the data stored in the common DB 210 and/or the degree of decision thereof with the definition contents of the status stored in the data table storage DB 202 to specify the current progress stage of a series of business processings.

In addition, the data transmission block 222 refers to the contents of the view items and the destination stored in the data table storage DB 202 on the basis of the current progress stage which has been specified by the status judgement block 221. In addition, the data transmission block 222 read out the data of the data items which are necessary as the view items from the common DB 210 to transmit the data thus read out to one of the input/output units 231*a* to 231*n* corresponding to the set destination.

Figure 2:
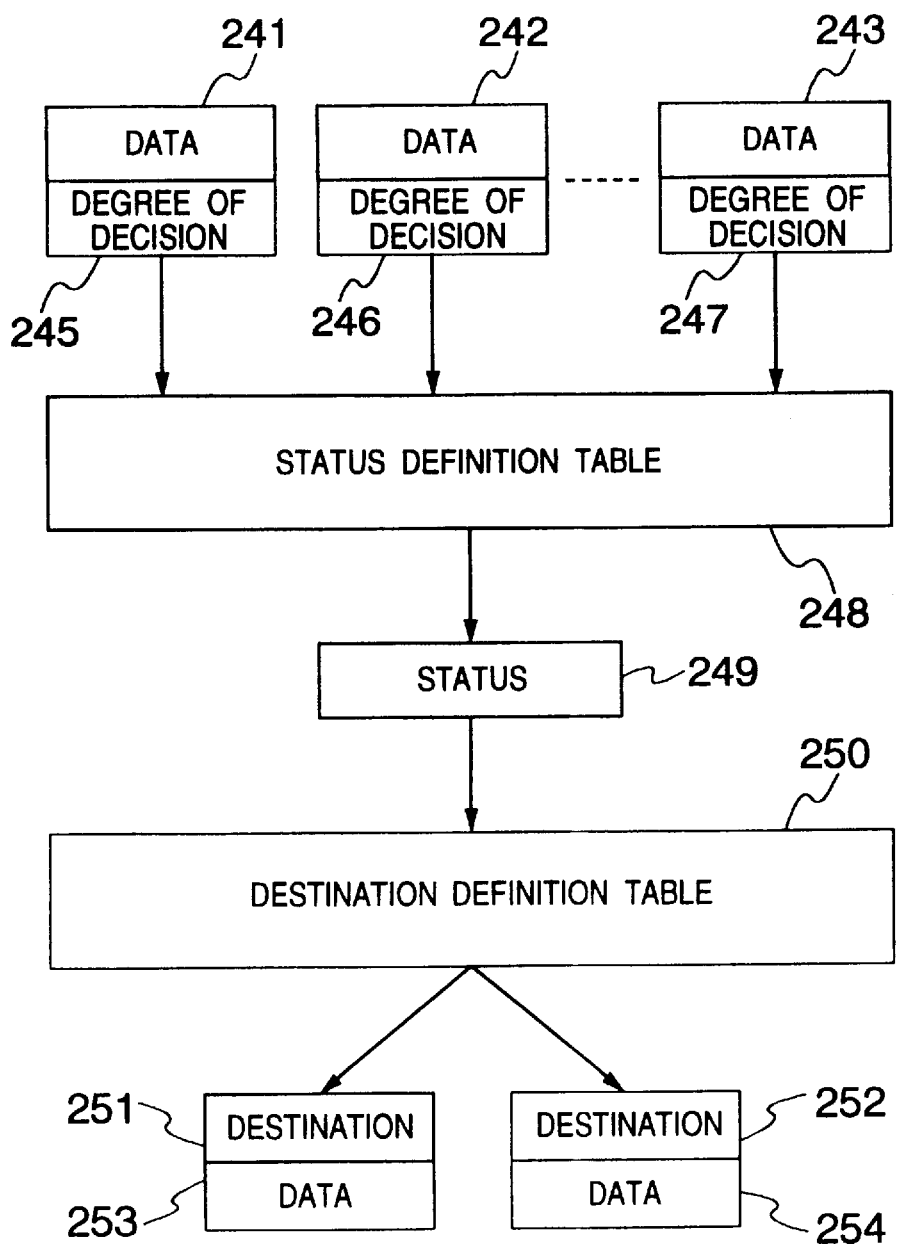
FIG. 2 is a schematic view useful in explaining the data transmission according to the present invention.

FIG. 2 is a schematic view for explaining the outline of the process in which the data is transmitted to the associated section in charge of the business processing in a series of business processings. The data 241 to 243 to be input in the section in charge of inputting the data is input together with the respective degrees of decision 245 to 247 as the parameters.

Both the data 241 to 243 and the degrees of decision 245 to 247 are compared with the definition data in the status definition table 248. As a result, the current progress stage, i.e., the status 249 is specified.

The data relating to the specification results is transmitted to the destination definition table 250 which judges both the data items to be transmitted in the current status 249 and the transmission destination. Then, on the basis of the judgement results, the necessary data 253 and 254 is automatically transmitted to the destinations 251 and 252, respectively.

FIG. 3 is a schematic view showing a structure of a data storage frame in the common DB 210. An area of a key item 301 which is common to the sections in charge of the business processing and which collectively manages the progress situation of a series of business processings through a series of objective business processings is provided in the data storage frame. In the present embodiment, all of the data relating to one order from one customer is treated as one set through a series of business sales processings, and then "Order No" is set as the key item 301 for collectively managing one set of data.

Areas in which the data values 303 and parameters 304 (refer to FIG. 4) representing the degrees of decision of the data values are respectively stored are provided in data item 302 which is commonly necessary between the participating sections in charge of the business processing through a series of business processings with key item 301 being the most significant, and hence the data values 303 and the parameters 304 which are required by the associated section in charge of the business processing are stored in the areas, respectively.

In the present embodiment, as shown in FIG. 4, there are prepared three kinds of parameters 304, i.e., "not input" 3041, "undecided" 3042, and "decided" 3043. In this connection, the codes of 00, 01 and 02 are assigned to "not input" 3041, "undecided" 3042, and "decided" 3043, respectively. Incidentally, in order to further distinguish between "not input" and a default value, a default value code may be newly added to prepare the four kinds of parameters.

Now, "not input" 3041 represents that the data value is not input. "undecided" 3042 represents that the data value itself has already been input, but the data value thus input is a data value which has already been input as the scheduled information by reason of the business processing of the associated section, the progress condition of the negotiation with the customer, or the like. "decided" 3043 represents that the data value is the decided information.

The section in charge of inputting the data in a series of business processings does not necessarily input those parameters 304 in the order of "not input" 3041 → "undecided" 3042 → "decided" 3043.
Alternatively, that section may input those parameters 304 in the order of "not input" 3041 → "decided" 3043. This reason is that the data value is not necessarily decided in the order of "not input" 3041 → "undecided" 3042 → "decided" 3043 in the actual business activities.

Next, the description will hereinbelow be given with respect to the status definition contents and the setting processing thereof in the status setting block 201 with reference to FIGS. 5 to 9.

FIG. 5 is a view showing a structure of the status definition table 248 which is formed in the data table storage DB 202. Both a standard status 805 and a user definition status 806 which is originally set by each section in charge of the business processing are provided in the status definition table 248 in which the status judgement conditions utilizing the decision degrees and/or data values of a plurality of data items are set in a direction of the abscissa (in the direction of a vertical column) of the figure.

In this example, the contents representing the progress stage of a series of business processings such as "existence of deal", "start of estimation", "preparation of precontract", "preparation of decision", "summing up of credit sales", and "summing up of proceeds" are set in the standard status 805.

In addition, the contents representing the progress stage different from that of the standard status, such as "in estimation a" and "in estimation b", can be set as the user definition status 806.

Figure 6:
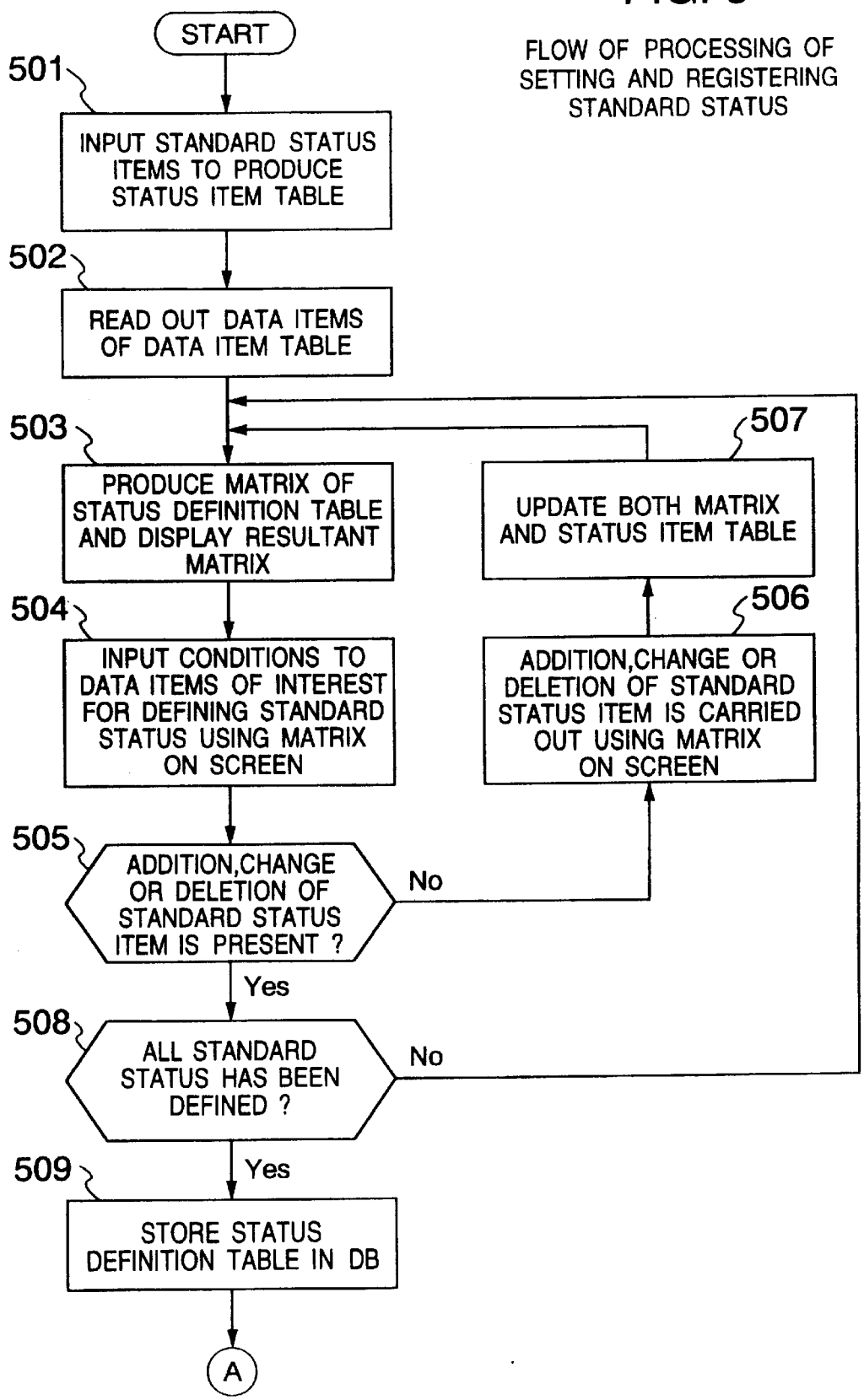
FIG. 6 is a flow chart showing the processing of setting/registering the standard status in the status definition table.

FIG. 6 is a flow chart showing the processing relating to the definition and the registration of the standard status 805 which is commonly set in each of the sections in charge of the business processing.

Since the standard status 805 relates commonly to each of the sections in charge of the business processing, the processing for the definition and the registration is executed therefor in predetermined timing in accordance with the contents of all of the business activities. For example, the processing for the definition and the registration is executed when starting up the system or changing the system of the business processing section.

When the standard status 805 is defined, first, the items such as "existence of deal" in the standard status 805 are input using the input/output unit (e.g., the unit 231*a*) of the business processing section having the power of setting the registration, thereby producing a status item table 700 as shown in FIG. 7 (Step 501).

The status items in this case are made coincident with the status items in the status definition table 248 of FIG. 5 which is to be produced finally.

Figure 8:
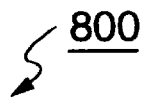
FIG. 8 is a schematic view showing another structure of a status item table.

Next, the data items such as "Order No" which re previously set in a data item table 800 in the data table storage DB 202 are read out as shown in FIG. 8 (Step 502).

The data items which are set in this data item table 800 are the same as those which are input/ outputted to/from the common DB 210 by the associated section. The matrix of the status definition table 248 is produced with the status items and the data items as the axis of ordinate and the axis of abscissa, respectively, and the matrix of the status definition table 248 is displayed on the screen of the input/output unit 231*a* (Step 503).

Then, the comparison conditions 801 for the data value, the parameters 807 representing the decision degrees of the data value or the judgement conditions containing the combination conditions thereof 802 are input to the data items prescribing the progress stage of a series of business processings such as "existence of deal", "start of estimation", "preparation of precontract", "preparation of decision", "summing up of credit sales" and "summing up of proceeds" using the matrix of the status definition table 248 which is being displayed on the screen of the input/output unit 231*a*, thereby defining the status (Step 504).

As an example of the combination conditions 802, the case can be taken where "appointed delivery day for customer" has already been decided, and also the value thereof exceeds the currently appointed delivery day.

In FIG. 5, for example, the combination conditions mean that in the stage in which "Order No" is decided, "Name of Customer" is decided and "Contents of Product" is undecided, it becomes the status 803 of "Start of Estimation".

In addition, the combination conditions also mean that when "Order No" is decided and "Transaction Price" exceeds 200,000 yen, for example it becomes the status 804 of "In Estimation".

Incidentally, the default values, each of which means that it does not participate in the judgement conditions of the status, are stored in blank portions where no condition is set, respectively.

Next, the person in charge of the business processing is inquired about whether or not the addition, the change or the deletion of the status items is present (Step 505). When the addition, the change or the deletion is present, that person is instructed to carry out the operation of the addition, the change or the deletion with respect to the column of the status item of the matrix on the screen of the input/output unit, and then in accordance with the operation, the addition, the change or the deletion of the status item is carried out (Step 506).

Then, both the displayed matrix and the contents of the status definition table 248 are updated (Step 507). Then, the same processings will be repeated from Step 503.

When the definition of the judgement conditions of all the status items has been completed (Step 508), both the status item table 700 and the status definition table 248 are stored in the data table storage DB 202 to be registered therein (Step 509).

Figure 9:
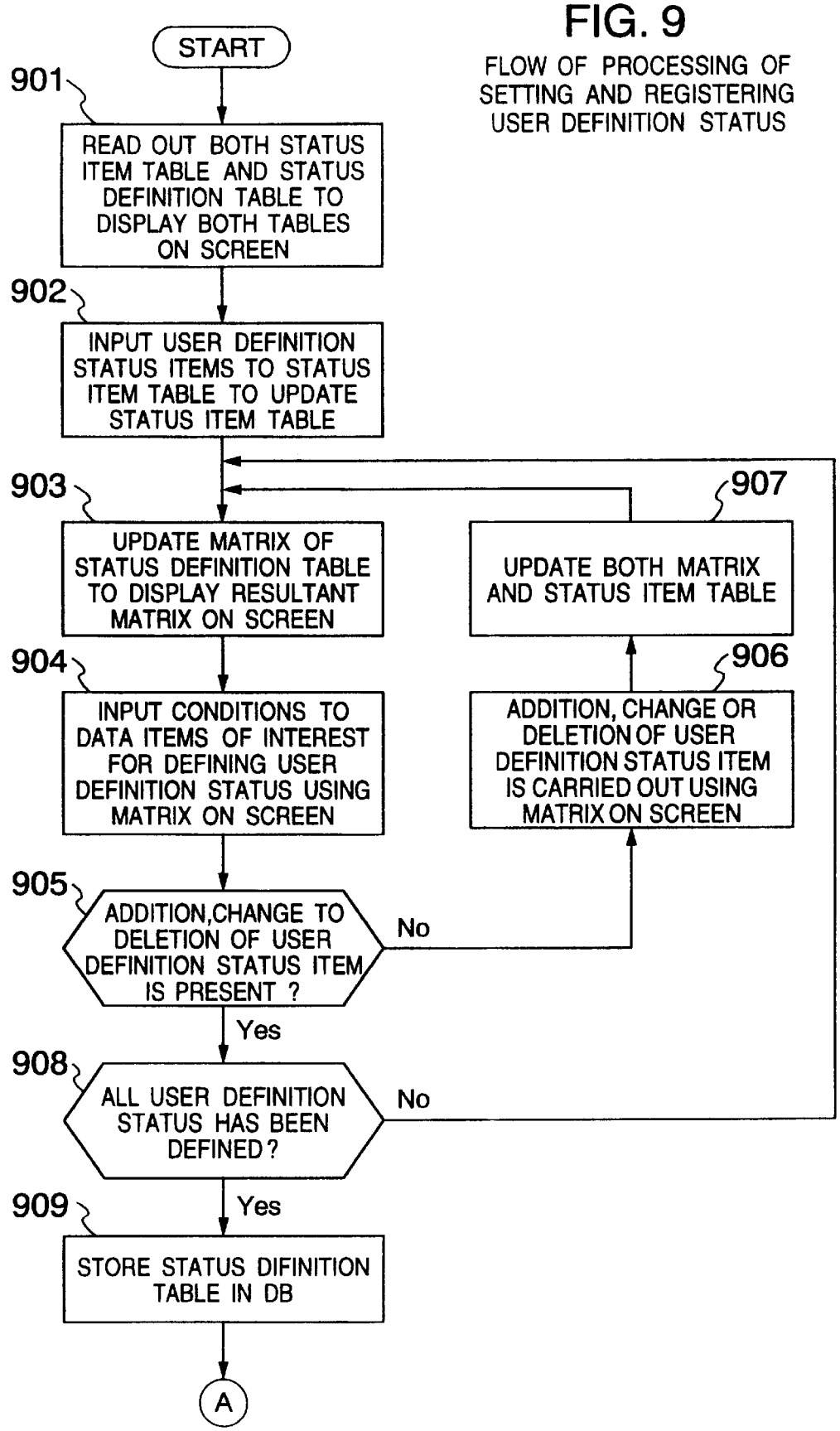
FIG. 9 is a flow chart showing the processing of setting/registering a user definition status in the status definition table.

FIG. 9 is a flow chart showing the processing of setting and registering the user definition status 806 which the associated section uses originally in addition to the standard status 805.

This processing is executed when the associated sections set at all times the user definition status 806 using their input/output units 231*a* to 231*n* independently of the standard status 805 in accordance with the contents and the situation of the respective businesses for which the associated sections are responsible.

Firstly, both the status item table 700 and the status definition table 248 are read out from the data table storage DB 202 to be displayed on the screen of the input/output unit 231*x* (x is any one of a to n) of the associated section (Step 901).

Under this display state, the definition status items by section in charge of the business processing such as "in estimation a" 711 and "in estimation b" 712 are input to the status item table 700, thereby updating the contents of the status item table 700 (Step 902).

Subsequently, the same processings as those when the definition and the judgement conditions of the standard status 805 are set are executed from Step 903 to Step 909.

Since the processings from Step 903 to Step 909 are substantially the same as those from Step 503 to Step 509 of FIG. 5, the description thereof is omitted here for the sake of simplicity.

The standard status 805 and the user definition status 806 are independent of each other with the frequency and timing of the setting and registration processing. Therefore, in Step 904, the status definition table 248 is divided into the definition area of the standard status 805 and the definition area of the user definition status 806 such that the standard status 805 and the user definition status 806 can be respectively defined.

Next, the description will hereinbelow be given with respect to the processing relating to both the definition and the registration of the view item and the destination in the view item/destination setting block 203 with reference to FIGS. 10 and 11.

FIG. 10 is a flow chart showing the processing of setting and registering both the destination of the section in charge of the business processing to which the data must be transmitted and the view item of the data which that section requires when the business processing reaches a predetermined status (progress stage). In this connection, the above-mentioned processing for the status setting block 230 is followed by this processing.

First, both the data item table 800 and the status item table 700 are read out from the data table storage DB 202 (Step 1001), and then a matrix of a view item/destination definition table 1100 as shown in FIG. 11 is produced, and the resultant matrix is displayed on the screen of the input/output unit 231*a* having the setting power (Step 1002). The destination definition table 250 shown in FIG. 2 is the same in structure as the view item/destination definition table 1100.

Then, a destination ID code of the section in charge of the business processing to which the data is transmitted is input in correspondence to the status items using the screen of the input/output unit (Step 1003). Next, a mark 1102 specifying the data item to be transmitted is input, thereby setting the view item which is necessary as the information to be transmitted (Step 1004).

In this case, if another destination is present to which the same status item is to be transmitted (Step 1005), Step 1103 and Step 1104 are repeatedly executed.

Next, when the setting has been completed with respect to all the status items which are registered in the status item table 700 (Step 1006), the data item table 800, the status item table 700, and the view item/destination definition table 1100 are stored in the data table storage DB 202 to be registered therein (Step 1007).

For example, in FIG. 11, that processing means that when the standard status 805 reaches the stage of "Preparation of Precontract" 808, the data of the data items of "Order No", "Name of Customer" and "Contents of Product" is transmitted to the associated section having the destination ID=0120, and further the data of the data items of "Order No" and "Transaction Price" is transmitted to the associated section having the destination ID=0140.

As described above, in the setting registration block 200, both the status definition and the definition of the view item/destination are previously carried out for the data table storage DB 202.

Under this state, if the orders actually occur and a series of selling business processings are started, the key items 301 (refer to FIG. 3) are numbered in the order of occurrence of the orders in the common DB 210, and the area in which the data value 303 of the data item 302, and the parameters 304 representing that the decision degrees of the data value 303 are stored are ensured for every key item 301.

Each of the sections in charge of the business processing inputs at all times both the data value 303 of the data item 302 and its parameter 304, of which the associated section is in charge, to the associated input/output unit 231*n* for every key item 301 when the data item 302 and its parameter 304 have become clear, and stores them in the common DB 210.

Figure 12:
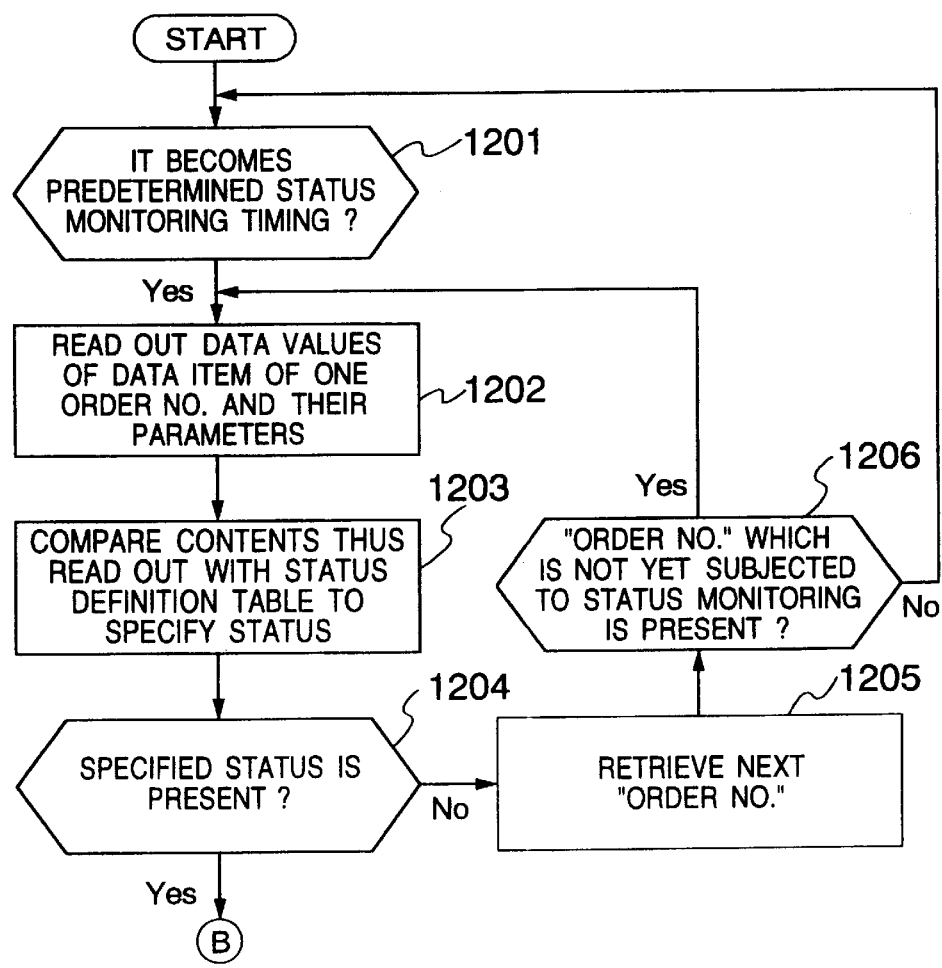
FIG. 12 is a flow chart showing the processing of judging the status.

Next, the description will hereinbelow be given with respect to the processings in the status judgement block 221 with reference to FIGS. 12 and 13. Incidentally, all the processings in this block 221 are executed by the control block 220.

Firstly, it is judged whether or not it becomes a predetermined status monitoring timing (Step 1201). If it becomes a predetermined status monitoring timing (Step 1201), all of the data values 303 of the data item 302 of one "Order No" and the parameters 304 thereof are read out from the common DB 210 (Step 1202).

In this case, the status monitoring timing may be determined so as to be once every six hours or once every one hour for example in accordance with the business contents. In this connection, the status monitoring timing is the timing which is common to the sections in charge of the business processing.

Next, both the data values 303 of the data item 302 of one "Order No" and the parameters 304 which have been read out are compared with the defined contents of the status definition table 248 which are registered in the data table storage DB 202, and then it is judged whether or not at least one status having coincidence therebetween is present among the defined statuses (the progress stages)(Step 1203). In Step 1203, when the comparison is carried out on the basis of the comparison standard of FIG. 13 which will be described later, a plurality of statuses each having coincidence may be present in some cases. In such cases, the status in which the progress stage most progresses out of a plurality of statuses each having coincidence is treated as the status which is specified in the present monitoring. When the specified status is not present ("No" in Step 1204), the next "Order No" is retrieved (Step 1205). Then, when "Order No" is present which is not still subjected to the status judgement (Step 1206), the processings are repeated from Step 1202.

When the status judgement with respect to all "Order Nos" has been completed (Step 1206), the timing of the next status monitoring is awaited.

When the status is specified in Step 1204, the processing proceeds to the processings in the next data transmission block 222.

Now, FIG. 13 shows the comparison standard with respect to the parameters 304 every data item 302 in Step 1203.

Firstly, when no parameter 807 is set to the status definition table 248, even if the parameter 304 of the data values which has been read out from the common DB 210 is "not input" 3041, "undecided" 3042 or "decided" 3042, it is judged that the coincidence is obtained (standard 1301).

When the parameter 807 which is set in the status definition table 248 is "undecided" 3042, even if the parameter 304 of the data value which has been read out from the common DB 210 is either "undecided" 3042 or "decided" 3043, it is judged that the coincidence is obtained (standard 1302).

In addition, when the parameter 807 which is set in the status definition table 248 is "decided", when the parameter 304 of the data value which has been read out from the common DB 210 is "decided", it is judged that the coincidence is obtained (standard 1303). As a result, even if the combination of the data value thus read out and the parameter does not match perfectly with the definition contents of the status definition table 248, the most suitable status is specified.

Next, the description will hereinbelow be given with respect to the processings in the data transmission block 222 with reference to FIG. 14.

Firstly, the status item having coincidence, the data value of the data items 302 and the parameters 304 are received from the status judgement block 221 every "Order No" (Step 1401).

Then, the view item/destination setting table 1100 which is registered in the data table storage DB 202 is referred to on the basis of the status item having coincidence, and the destination ID code 1101 corresponding to the status item of interset and the view item which is to be transmitted to the destination corresponding to the destination ID code 1101 are discriminated (Step 1403).

Next, the alarm information is sent to the input/output unit 231x (x is any one of a to n) of the section to which the destination ID code 1101 is transmitted in order to inform that the transmission of the data is started (Step 1403). As for the alarm information, a part of the view item, e.g., "Order No" and the status item, or the message for informing that the data transmission occurs and the like are employed.

On the other hand, the person in charge of the business processing who has recognized the alarm information from the input/output unit 231n inputs a reception instruction of the transmission data (Order No, the status item, the view item and its data value, and the parameters) using the associated input/output unit 231x (x is any one of a to n) (Step 1404) and instructs the input/output unit 231x (x is any one of a to n) to fetch therein this transmission data to display this transmission data on the display portion (Step 1405).

As a result, the data in the progress stage is transmitted to the associated sections each of which requires that data.

In summary, it is judged on the combination of the input situation and the decision degrees of the data to which status item of a plurality of predetermined status items the present status of a series of business processings corresponds, and both the destination, which requires the destination of the data, and the data item are decided in the status item which has been obtained by the judgement results in accordance with the definitions of the view item/destination definition table 1100, and the necessary data is transmitted to the destination which has been obtained by the decision results.

Therefore, according to the present embodiment, assuming that the data which is to be transmitted from the section A to the section B extends over the three items a1, a2 and a3 for example, if it is defined in the status definition table 248 that at the time when a1 and a2 have been input, the status progresses by one stage, and further it is defined therein that the data of the data items a1 and a2 are transmitted to the section B in that status, even when the data item a3 is still undecided or not yet input, only the data of the data items a1 and a2 is transmitted to the section B prior to the data of the data item a3.

As a result, even if the undecided portion is contained in the data which is necessary for a series of business processings, that necessary data can be transmitted to the business processing section (the section or the person in charge of the business processing) which wants to confirm previously that necessary data. That is, even in the stage in which all the data which is to be input in the preceding business processing section is not completed, a part of the data can be transmitted to the subsequent business processing section in advance.

In addition, the business processing section which has received the data can immediately be made aware of the progress situation of a series of business processings on the basis of the contents of the received items, and also can promote the increasing of efficiency of a series of business processings by starting the preparatory work for making provision for the next progress stage.

In addition, the fact that the necessary data is immediately transmitted to the associated destination, which requires the necessary data, in accordance with the change in the progress stage of a series of business processings means that the useless residence time of the effective data is eliminated, and hence it becomes very useful in terms of the progress management.

In this case, since the destination is defined in the view item/destination definition table 1100, the destination specifying operation with respect to the transmission/reception becomes also unnecessary.

Further, since the data such as the name of the customer and the like which are commonly used in the business processing sections are input in any section in charge of the business processing in a series of business processings, such data does not need to be input repeatedly in a plurality of business processing sections.

If in addition to the standard statuses 805 which are common to the business processing sections, the user definition statuses 806 which are inherent in the respective business processing sections are set in both the status definition table 248 and the view item/destination definition table 1100, the necessary data is transmitted to the corresponding business processing section in accordance with the inherent user definition statuses 806.

As a result, the definitions which are inherent in the respective business processing sections are set, whereby the necessary data of the data which have been input in the business processing sections can be freely obtained by the associated business processing section.

For example, when the division is more finely carried out between "Preparation of Precontract" and "Preparation of decision" shown in FIG. 11 and the data corresponding to the progress situation between the substatuses obtained by the finer division is intended to be transmitted, that effect is defined in the user definition status 806 of the status definition table 248, and the same user definition status is set in the view item/destination definition table 1100 and the transmission data item is set therein. In other words, the necessary data which is used in a series of business processings can be freely obtained.

Further, both the definition matrix of the status definition table 248 and the definition matrix of the view item/destination definition table 1100 are displayed on the screen of the input/output unit, and the necessary definition data is input onto the screen, whereby both the definition matrix of the status definition table 248 and the view item/destination definition table 1100 are produced. Therefore, both the status definition and the view item/destination definition can be readily carried out, and also the change can also be readily carried out. Thus, it is possible to flexibly cope with the system change and the like in a series of business processings.

While the parameters of the three stages of "not input" 3041, "undecided" 3042 and "decided" 3043 are exemplified as the parameters representing the decision degrees of the data in the above-mentioned embodiment, the present invention is not limited thereto. That is, it is to be understood that more multiple stages can also be set in accordance with the business contents.

In addition, while there is shown an example in which in order to make the distinction between the standard status and the user definition status easy, the status definition table 248 is divided into the setting area of the standard status and the setting area of the user definition status to set both the statuses, the present invention is not limited thereto. That is, the setting can be carried out in the input time order.

In addition, while in Step 1202 the data is read out every "Order No" in the status judgement processing, the present invention is not limited thereto. That is, alternatively, a method of reading out the data for all "Order Nos" at a time may be adopted.

Furthermore, the comparison standards of the parameters are not limited to those shown in FIG. 13, but the comparison standards of the parameters may be determined in accordance with the number of parameters, which was previously set, and the semantic content thereof.

Further still, while there is shown an example in which the contents of the common DB 210 is fetched in the status judgement block 221 once, and each of the associated sections in charge of the business processing receives the data through the data transmission block 222, the present invention is not limited thereto. That is, the procedure may also be adopted such that after the status judgement block 221 has referred to the contents of the common DB 210 and the associated section as received the alarm information from the data transmission block 222, that associated section fetches therein the data from the common DB 210.

While the present invention has been particularly shown and described with reference to the preferred embodiment thereof, it will be understood by those skilled in the art that the foregoing and other changes in form and details can be made therein without departing from the spirit and scope of the invention.

We claim:

1. In a data processing system for carrying out a series of processings, utilizing a database common, by a plurality of processing sections each having a data input/output unit, a method of selectively transmitting data used in the series of processings to the plurality of processing sections, said method comprising the steps of:

producing previously a destination definition table in which, for each of a plurality of progress stages in the series of processings, a processing section as a destination of transmission of data in a progress stage of interest, and a data item of the data to be transmitted are defined;

storing data used in the series of processings and parameters representing degrees of decision of the data of interest in storage areas corresponding to data items to which the data of interest belong in said common database, input from said plurality of processing sections through the data input/output units belonging thereto;

specifying a progress stage in the series of processings on the basis of the data stored in said common database and the degrees of decision of the data;

obtaining a processing section as the destination in the specified progress stage and a data item of data to be transmitted by referring to said destination definition table as the specified progress stage as a key;

reading out the data of the obtained data item from said common database; and transmitting electrically the read out data to the processing section as the destination to enable the read out data to be output from the data input/output unit belonging to the processing section as the destination.

2. A method according to claim 1, further comprising the step of producing previously a status definition table in which, with respect to each of the plurality of progress stages in the series of processings, a combination of the data which is necessary for specifying the progress stage of interest and the decision degrees of the data are defined, wherein, in said step of specifying the progress stage, the progress stage in the series of processings is specified by referring to said status definition table.

3. A method according to claim 1, wherein said destination definition table is set and changed from the predetermined processing section in the plurality of processing sections through the data input/output unit belonging to the predetermined processing section.

4. A method according to claim 2, wherein said status definition table is set and changed from the predetermined processing section in the plurality of processing sections through the data input/output unit belonging to the predetermined processing section.

5. A method according to claim 3, wherein said destination definition table is set and changed with a definition inherent in an arbitrary processing section in the plurality of processing sections by said arbitrary processing section through a data input/output unit belonging to said arbitrary processing section.

6. A method according to claim 4, wherein said status definition table is set and changed with the definition inherent in the arbitrary processing section in the plurality of processing sections by the arbitrary processing section through the data input/output unit belonging to the arbitrary processing section.

7. A method according to claim 1, wherein said step of specifying the progress stage is executed periodically.

8. A method according to claim 1, wherein the degrees of the data include "not input", "undecided" and "decided".

9. A method according to claim 2, wherein, in said step of specifying the progress stage, the data stored in said common database and the degrees of the data are compared with the contents of the definitions in said status definition table, thereby specifying the progress stage in the series of processings.

10. A method according to claim 9, wherein, in said step of specifying the progress stage, when, as the results of comparison of the data stored in said common database and the degrees of the data with the contents of the definitions in said status definition table, a plurality of progress stages are obtained as the candidates, the candidate having the most advanced progress stage is specified as the progress stage in the series of processings.

11. A data processing system, comprising:
a common database for storing data which is necessary for a series of processings and parameters representing degrees of decision of the data in storage areas corresponding to data items to which the data belongs;
a plurality of data input/output units which are respectively provided in a plurality of processing sections;
a status setting unit connected to said plurality of data input/output units for defining progress stages in the series of processings;
a destination setting unit connected to said plurality of data input/output units, for defining a processing section, to which data is to be transmitted, for each of the progress stages in the series of processings;
definition storage means connected to said status setting unit and said destination setting unit, for storing definitions which are set in said status setting unit and said destination setting unit;
a status judgement unit connected to said definition storage means and said common database, for specifying a progress stage in the series of processings; and
a data transmission unit connected to said definition storage means, said common database and said plurality of data input/output units, for transmitting data of a data item specified by the progress stage specified in said status judgement unit to a processing section specified by said destination setting unit,
wherein said status setting unit produces previously a status definition table, in which the plurality of progress stages in the series of processings are defined using the data which are used in the series of processings and the degrees of decision thereof to form said status definition table in said definition storage means,
said destination setting unit produces previously a destination definition table in which, for each of the plurality of progress stages in the series of processings, a processing section to which data in the progress stage of interest is to be transmitted and a data item of the data to be transmitted are defined to form said destination definition table in said definition storage means,
the data used in the series of processings and the degrees of decision of the data are successively stored in storage areas corresponding to the data items, to which the data belong in said common database by the data input/output units belonging to the associated processing sections in said plurality of processing sections,
said status judgement unit reads out data stored in said common database and degrees of the data and specifying a progress stage in the series of processings by referring to said status definition table in said definition storage means, and
said data transmission unit obtains a processing section as a destination in the specified progress stage and a data item of the data to be transmitted by referring to said destination definition table in said definition storage means with the specified progress stage as a key, reads out data of the data item obtained by said common database, and electronically transmits the data thus read out to a data input/output unit belonging to the processing section as the destination so as to enable the read out data to be output.

12. A data processing system according to claim 11, wherein said status setting unit sets and changes definitions in said status definition table on the basis of a data input from the predetermined processing section in said plurality of processing sections through the data input/output unit belonging to the predetermined processing section.

13. A data processing system according to claim 12, wherein said status setting unit sets and changes definitions inherent in an arbitrary processing section in said plurality of processing sections based on data input from said arbitrary processing section through a data input/output unit belonging to said arbitrary processing section.

14. A data processing system according to claim 11, wherein said destination setting unit sets and changes definitions in said destination definition table on the basis of data input from the predetermined processing section in said plurality of processing sections through said data input/output unit belonging to the predetermined processing section.

15. A data processing system according to claim 14, wherein said destination setting unit sets and changes definitions inherent in an arbitrary processing section in said plurality of processing sections based on data input from the arbitrary processing section through said data input/output unit belonging to said arbitrary processing section.

16. A data processing system according to claim 11, wherein said status judgement unit specifies the progress stage of the series of processings periodically at predetermined intervals of time.

17. A data processing system according to claim 11, wherein the degrees of the data includes "not input", "undecided" and "decided".

18. A data processing system according to claim 11, wherein said status judgement unit specifies the progress stage in the series of processings by comparing the data stored in said common database and the degrees of the data with the contents of the definitions in said status definition table.

19. A data processing system according to claim 18, wherein when, as the results of comparison of the data stored in said common database and the degrees of the data with the contents of the definitions in said status definition table, a plurality of progress stages are obtained as the candidates, said status judgement unit specifies the candidate having the most advanced progress stage as the progress stage in the series of processings.

20. A method of transmitting data which are necessary for business processing sections to a plurality of data input/output units which are provided in the plurality of business processing sections in a series of business processings through a network, said method comprising the steps of:

(a) inputting, when inputting data of a plurality of items which are objects of transmission from data input/output units of business processing sections, parameters representing degrees of decision together with the data to store the data and the parameters thereof in a database which is common to the business processing sections;

(b) checking the data stored in said database on the basis of a progress stage definition table in which relationships between statuses of the data items indicated by said parameters and the progress stages in the series of business processings are defined, to determine a progress stage in the series of business processings; and (c) determining a data item to be transmitted in the progress stage which has been judged in said step (b) and a destination of transmission on the basis of a transmission destination definition table in which relationships among the progress stages in the series of business processings, the data items as objects of transmission and destinations of transmission are defined, fetching data of the data item thus determined from said database, and transmitting the data of the data items thus determined to a data input/output unit of the destination thus determined.

21. A data transmission method according to claim 20, wherein said progress stage definition table includes the definitions which are common to the business processing sections and the definitions which are inherent in the respective business processing sections.

22. A data transmission method according to claim 20, wherein said transmission destination definition table includes the definitions which are common to the business processing sections and the definitions which are inherent in the respective business processing sections.

23. A data transmission method according to claim 20, wherein a progress stage definition matrix in which the relationships between the judgement conditions containing the input situation of the data items and the parameters and the progress stages of the series of business processings are displayed on the screen of the associated data input/output unit, and both the progress stage definition items and the judgement conditions are input to said progress stage definition matrix, thereby producing said progress stage definition table.

24. A data transmission method according to claim 21, wherein a progress stage definition matrix in which the relationships between the judgement conditions containing the input situation of the data items and the parameters and the progress stages of the series of business processings are displayed on the screen of the associated data input/output unit, and the progress stage definition items and the judgement conditions are input to said progress stage definition matrix, thereby producing said progress stage definition table.

25. A data transmission method according to claim 20, wherein a transmission destination definition matrix in which the relationships among the progress stages of the series of business processings, the data items as objects of the transmission and the transmission destinations are defined are displayed on the screen of the associated data input/output unit, and the relationships among the progress stage definition items, the data items as objects of the transmission and the transmission destinations are input to the transmission destination definition matrix, thereby providing said transmission destination definition table.

26. A data transmission method according to claim 22, wherein a transmission destination definition matrix in which the relationships among the progress stages of the series of business processings, the data items as objects of the transmission and the transmission destinations are defined are displayed on the screen of the associated data input/output unit, and the relationships among the progress stage definition items, the data items as an object of the transmission and the transmission destinations are input to the transmission destination definition matrix, thereby providing said transmission destination definition table.

27. In a data processing system for carrying out a series of processings utilizing a database by a plurality of processings unit, a method of transmitting data used in the series of processings to the plurality of processing units, said method comprising the steps of:

producing previously a destination definition table in which, with respect to each of a plurality of progress stages in the series of processings, the processing unit as the destination of transmission of the data in the progress stage of interest is defined;

storing the data used in the series of processings and parameters representing degrees of decision of the data of interest in storage areas, corresponding to the data items to which the data of interest in the database, from the processing unit of said plurality of processing unit;

specifying the progress stage in the series of processings on the basis of the data stored in said database and the parameters;

obtaining the processing unit as the destination in the specified progress stage by referring to said destination table as the specified progress stage as a key;

reading out the data from said database; and electrically transmitting the read out data to the processing unit as the destination to enable the read out data to be output from the processing unit as the destination.

28. A method according to claim 27, further comprising the step of producing previously a status definition table in which, with respect to each of the plurality of processings, a combination of the data which is necessary for specifying the progress of the data are defined, wherein said step of specifying the progress stage, the progress stage in the series of processing is specified by referring to said status definition table.

29. A method according to claim 27, wherein said step of specifying the progress stage is executed periodically.

30. A method according to claim 27, wherein the degrees of decision includes "not input", "undecided", and "decided".

31. A method according to claim 30, wherein said step of specifying the progress stage, the data and the parameters stored in said database are compared with the contents of the definitions in said status definition table, thereby specifying the progress stage in the series of processings.

32. A method according to claim 31, wherein said step of specifying the progress stage, when as the results of comparison of the data stored in said database and the degrees of the data with the contents of the definitions in said status definition table, a plurality of progress stage are obtained as the candidates, the candidate having the most advanced progress stage is specified as the progress stage in the series of processings.

* * * * *